United States Patent Office 2,748,174
Patented May 29, 1956

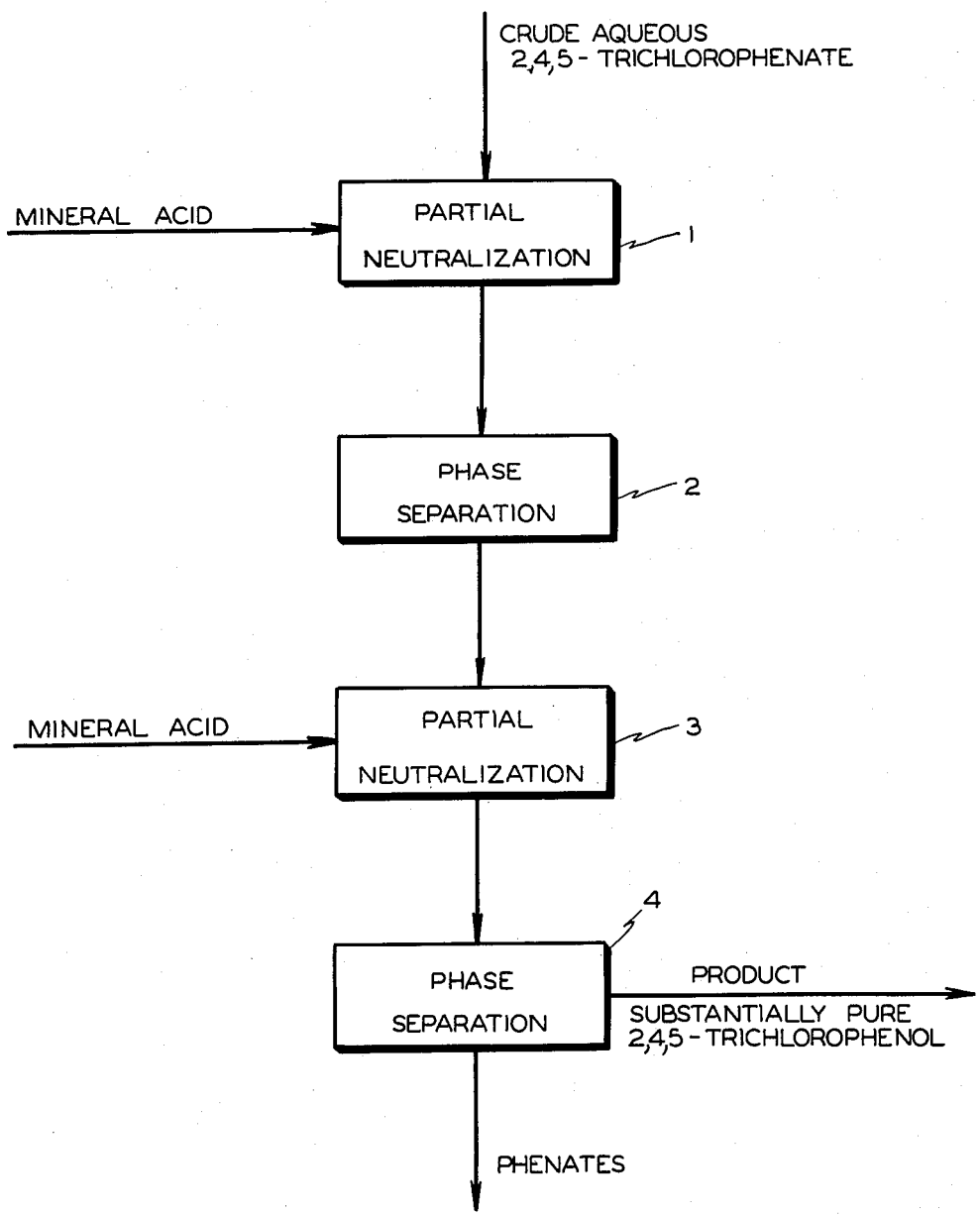

2,748,174

PROCESS FOR THE RECOVERY OF PURE 2,4,5-TRI-CHLOROPHENOL FROM PRODUCTS OF THE ALKALINE HYDROLYSIS OF 1,2,4,5-TETRA-CHLOROBENZENE

Theodore M. Jenney and Bernard H. Nicolaisen, Kenmore, N. Y., assignors to Olin Mathieson Chemical Corporation, a corporation of Virginia Application February 2, 1953, Serial No. 334,746

2 Claims. (Cl. 260—623)

Our invention relates to the production of 2,4,5-trichlorophenol by caustic hydrolysis of 1,2,4,5-tetrachlorobenzene and in particular relates to the purification of the crude 2,4,5-trichlorophenol product so derived.

In the caustic hydrolysis of 1,2,4,5-tetrachlorobenzene numerous contaminating products are formed. Methanol, for example, which may be used as a solvent for the hydrolysis reaction, tends to cause some production of trichloroanisole and dichlorodimethoxybenzene. The presence of the usual small amounts of other tetrachlorobenzene isomers, such as 1,2,3,4-tetrachlorobenzene, as impurities in the symmetrical 1,2,4,5-tetrachlorobenzene, causes the production of undesired position isomers of 2,4,5-trichlorophenol.

At the present time there exists a substantial demand for a high purity 2,4,5-trichlorophenol product which is not satisfied by the crude derived by the caustic hydrolysis of 1,2,4,5-tetrachlorobenzene. The demand is, in particular, for a product having a melting point over 65° C. which in the molten state has a color from white to near white. The product must also be completely soluble in caustic solution, e. g. 0.1 N NaOH, and should be at least 99% pure.

Caustic insolubles, such as trichloroanisole and dichlorodimethoxybenzene, may be removed to some extent by steam distillation although their complete removal requires inordinately large amounts of steam. Other impurities, however, such as the position isomers of 2,4,5-trichlorophenol, are more difficult to separate because of their similar chemical and physical properties.

We have discovered that a high purity 2,4,5-trichlorophenol product meeting the above specifications may be recovered from the crude product obtained by the caustic hydrolysis of 1,2,4,5-tetrachlorobenzene. We have found in particular that the solution of crude sodium 2,4,5-trichlorophenate which is recovered from the caustic hydrolysis of 1,2,4,5-tetrachlorobenzene may be separated from the undesirable contaminants noted above by a step-wise neutralization process.

The process of our invention thus essentially requires neutralizing crude 2,4,5-trichlorophenate solution by addition of mineral acid thereto in an amount sufficient to neutralize excess alkalinity of the solution and a minor proportion of the phenates present. The neutralized phenates are released as the free phenols which separate from the dilute aqueous mixture as a separate phase, i. e. when the total phenate-phenol concentration is not more than about 10% by weight. Thus, we contemplate the addition of water, when required, to adjust the phenate-phenol concentration to not more than 10% by weight, either prior to the first neutralization step or immediately thereafter, whereby the resulting phenols are phased out and then may be separated from the aqueous phase which contains the remaining unneutralized phenates.

The aqueous phenate phase separated from the phenol phase is further neutralized by the addition of mineral acid but in an amount sufficient only for recovery as the free phenols of substantially less than the total of the phenates remaining in solution. The phenols phase out upon the second neutralization step without further adjustment of phenate concentration, and are separated from the aqueous phenate phase and recovered as the desired pure 2,4,5-trichlorophenol product.

The invention will be further described in conjunction with the accompanying drawing which comprises a flow sheet illustrating the essential features of the applicants' process.

In the drawing an aqueous solution of crude 2,4,5-trichlorophenate obtained by the caustic hydrolysis of 1,2,4,5-tetrachlorobenzene is introduced to zone 1 of the flow sheet where it is contacted and partially neutralized with mineral acid. The phenols produced by the partial neutralization are separated in zone 2 by a phase separation based upon the insolubility of phenols in aqueous solutions having a phenol-phenate concentration of not more than about 10% by weight. The aqueous phenate solution is then subjected to a second partial neutralization in zone 3 by an additional quantity of mineral acid. The aqueous phenol-phenate solution is then subjected to a second phase separation of phenol in zone 4. The aqueous layer from this separation contains residual phenate which can be recovered as crude phenol and recycled. The phenol layer from the separation of zone 4 is the product, substantially pure 2,4,5-trichlorophenol.

The phenols precipitated in the first neutralization step, although they may be relatively impure, are suitable for use as crude trichlorophenol. The phenates remaining in solution after the second neutralization step may be recovered as the free phenols by complete neutralization and are also useful as crude trichlorophenol.

The amount of acid employed in the first neutralization steps ranges from an amount sufficient to neutralize the excess alkalinity and to spring free as little as about 1 or 2% of the phenates present up to an amount sufficient to spring free as much as a third or a half of the phenates present. The amount of acid added to neutralize the aqueous phase separated from the first neutralization step may range from about 25% to about 90 or 95% of that required to spring the phenates present as the corresponding phenols. The particular choice of proportion of acid added is largely dependent upon the purity of the original crude 2,4,5-trichlorophenate solution. In turn, the purity of this solution depends largely upon the purity of the 1,2,4,5-tetrachlorobenzene employed to produce the crude 2,4,5-trichlorophenate solution. More impure 2,4,5-trichlorophenate solutions require a greater amount of acid in the first neutralization step and a lesser amount in the second neutralization step. Generally, any mineral acid, such as sulfuric or hydrochloric acid, is suitable.

We have found that a pretreatment of the 2,4,5-trichlorophenate solution, such as by steam distillation to remove some of the caustic insoluble impurities, is extremely beneficial in that it lowers the required amount of acid for the first step of neutralization and permits a greater amount of acid to be employed in the second neutralization step, thus permitting highly increased yields of the recovered high purity products. Steam distillation of the product of the second neutralization is also advantageous as the color of the pure 2,4,5-trichlorophenol product is thus improved.

Our process is conveniently carried out at any temperature at which the phenate solution is in the liquid state, preferably between about 20° and about 80° C. The most important aspect of temperature is whether the phenols are to be phased out as solids or liquids; for the temperature at which the process is carried out must of course be selected having in mind whether a liquid-solid or a liquid-liquid separation is contemplated.

Example I

Crude 2,4,5-trichlorophenol obtained by acidifying the crude phenate product of the caustic hydrolysis of 1,2,4,5-tetrachlorobenzene and having the following analysis:

| | |
|---|---|
| M. P., °C. | 60–62 |
| $H_2O$, wt. percent | 0.00 |
| Ash, wt. percent | 0.05 |
| Neutral equivalent | 207 |
| | (Theoretical 198.5) |
| 2,4,5-trichlorophenol, wt. percent | 97.0 (infra-red) |
| 2,3,6-trichlorophenol, wt. percent | 1.0 (infra-red) |
| 2,4,5-trichloroanisole, wt. percent | 1.0 (infra-red) |
| Unidentified (not tars), wt. percent | 1.0 (approx.) | was reacted with caustic to a pH of 10 and steam distilled to remove trichloroanisole and some unidentified material, later proven to be dichlorodimethoxybenzene, from the phenate solution. To the resulting aqueous phenate solution was added one-third the amount of aqueous hydrochloric acid required to neutralize the slight excess of alkali and all the phenates present. Sufficient water was added to cause phase separation of the free phenols from the aqueous phenate solution, which was then decanted. The phenol layer was washed free of phenates with water and the washings added to the aqueous phenate layer. After steam distillation to separate color bodies the separated phenol contained 99% 2,4,5-trichlorophenol by infra-red analysis, was completely soluble in 0.1 NaOH solution, melted at 64–65° C. and had a neutral equivalent of 205–7.

An equal amount of hydrochloric acid was added to the residual phenate solution. The free phenol which was separated therefrom contained 100% 2,4,5-trichlorophenol by infra-red analysis, was completely soluble in 0.1 NaOH solution, melted at 65–65.5° C., had a neutral equivalent of 201, and was water white in the molten state.

A third cut was obtained by completely neutralizing the remaining phenates, resulting in precipitation of phenols which analyzed 98% 2,4,5-trichlorophenol and 1.5% 2,3,6-trichlorophenol by infra-red analysis.

Example II

In this example crude phenate solution, prepared as in Example I, was acidified step-wise following the procedure of Example I employing first 10% of the acid theoretically required to neutralize the slight excess alkalinity and all the phenates present as the free phenols, then 80% and then 10%. The steam distillation step was omitted and sufficient water was added before the first acidification to lower the phenate concentration to about 10% by weight. The first cut of phenols recovered was high in alkali insoluble organics containing only 67% 2,4,5-trichlorophenol by infra-red analysis. The center cut was 99.5% 2,4,5- and 0.5% 2,3,6-trichlorophenol by infra-red analysis and melted at 65.5–66° C. The third cut analyzed 98% 2,4,5-trichlorophenol.

In the following two examples all parts are by weight, unless otherwise noted.

Example III 100 parts of crude 2,4,5-trichlorophenol, having the same analysis as in Example I, are reacted with 20 parts sodium hydroxide in 950 parts water and 55 parts of washings from a previous batch to produce about 10% by weight phenate solution. 10% of the phenates are then phased out by addition of 10% of HCl (37% conc.) stoichiometrically required for complete neutralization. The phenols are separated by filtration and washed with 50 parts water, recovering 55 parts washings which are included in the preparation of the 10% phenate solution for a subsequent batch. The impure 2,4,5-trichlorophenol recovered from the washing operation is suitable for sale as crude trichlorophenol.

The filtrate of aqueous phenate solution is then treated with HCl (37% conc.) to phase out 80% of the phenates originally present as free phenols. The phenols are separated from the remaining aqueous layer by filtration and are washed with 50 parts water, recovering 60 parts washing which are added to the aqueous filtrate. The washed phenols are steam distilled and then dried to yield substantially pure 2,4,5-trichlorophenol.

The remaining filtrate, including 60 parts washings, noted above, is then treated with HCl (37% conc.) to spring free the remaining phenates as the phenols. The phenols which phase out are separated by filtration and are recovered for sale as crude trichlorophenols. About half the last group of phenols do not phase out and remain dissolved in the filtrate of the third neutralization step. They also may be recovered for crude sales.

Example IV 250 parts of crude 2,4,5-trichlorophenol of the same analysis as that employed in Example I are reacted with 50 parts sodium hydroxide in 250 parts water. 24.8 parts HCl (37% conc.) are added to spring free a portion of the phenates as the phenols. 2000 parts water are then added to phase out the phenols which are separated from the aqueous phenate phase by filtration. The phenols are washed and 16 parts recovered as crude trichlorophenol. The washings, combined with the aqueous filtrate, are treated with 100 parts HCl (37% conc.) to phase out 212.9 parts of 2,4,5-trichlorophenol which is washed and steam distilled to recover 165.6 parts pure 2,4,5-trichlorophenol. The washings, combined with the aqueous filtrate, are further treated with 27.2 parts HCl (37% conc.) to recover 3.2 parts of crude trichlorophenol.

We claim:

1. A process for the production of 2,4,5-trichlorophenol from aqueous mixtures of crude 2,4,5-trichlorophenate obtained by caustic hydrolysis of 1,2,4,5-tetrachlorobenzene, which comprises adding mineral acid to the crude 2,4,5-trichlorophenate mixture in amount sufficient to neutralize excess alkalinity and a minor proportion of the phenates present, which form corresponding phenols, separating the phenols as separate phase from dilute aqueous mixture having a phenol-phenate content of not more than about 10% by weight, adding mineral acid to the separated aqueous phase in an amount sufficient to convert less than the total quantity of remaining phenates to corresponding phenols, and separating 2,4,5-trichlorophenol from the aqueous phase.

2. A process for the recovery of 2,4,5-trichlorophenol from crude mixtures thereof obtained by caustic hydrolysis of 1,2,4,5-tetrachlorobenzene, which comprises adding aqueous caustic solution to crude 2,4,5-trichlorophenol to convert all phenols present to the corresponding phenates, adding mineral acid to the crude 2,4,5-trichlorophenate mixture in amount sufficient to neutralize excess alkalinity and a minor proportion of the phenates present, which form corresponding phenols, separating the phenols as a separate phase from dilute aqueous mixture having a phenol-phenate content of not more than about 10% by weight, adding mineral acid to the separated aqueous phase in an amount sufficient to convert less than the total quantity of remaining phenates to the corresponding phenols, and separating 2,4,5-trichlorophenol from the aqueous phase.

References Cited in the file of this patent

UNITED STATES PATENTS

| | | |
|---|---|---|
| 2,509,245 | Nikawitz et al. | May 30, 1950 |
| 2,563,815 | Bruce | Aug. 14, 1951 |
| 2,615,923 | Henrich | Oct. 28, 1952 |